United States Patent [19]
Shuda
[11] 3,729,684
[45] Apr. 24, 1973

[54] DATA DEMODULATOR EMPLOYING MULTIPLE CORRELATIONS AND FILTERS

[75] Inventor: Donald G. Shuda, Chelsford, Mass.
[73] Assignee: Sanders Associates, Inc., Nashua, N.Y.

[22] Filed: July 1, 1971
[21] Appl. No.: 158,844

[52] U.S. Cl. ....................329/104, 178/66, 325/320
[51] Int. Cl. ....................................................H04l 27/22
[58] Field of Search ....................329/104; 328/63; 325/30, 320; 178/66, 67, 88

[56] References Cited

UNITED STATES PATENTS 3,646,451 2/1972 Shoap....................................328/63
3,614,639 10/1971 Belman ...............................329/104
3,656,064 4/1972 Giles et al............................329/104

*Primary Examiner*—Alfred L. Brody
*Attorney*—Louis Etlinger

[57] ABSTRACT

A demodulator useful for demodulating multi-phase differentially coherent phase shift keyed (PSK) signals. In the four phase case, a pair of correlators operate upon the identity and non-identity of the PSK signal and two replicas of itself derived from the preceding baud or frame interval to produce first and second correlation signals. The first and second correlation signals are then filtered by means of first and second digital counter type filters with the direction of counting being controlled by corresponding ones of the correlation signal. The output of the filters are then compared with one another in sign and magnitude to detect the modulating information.

5 Claims, 11 Drawing Figures

INVENTOR
DONALD G. SHUDA
BY Robert R. Hubbard
ATTORNEY

INVENTOR
DONALD G. SHUDA
BY Robert R. Hubbard
ATTORNEY

Patented April 24, 1973

3,729,684

5 Sheets-Sheet 3

INVENTOR
DONALD G. SHUDA
BY Robert R. Hubbard
ATTORNEY

INVENTOR
DONALD G. SHUDA
BY Robert R. Hubbard
ATTORNEY

INVENTOR
DONALD G. SHUDA
BY Robert R. Hubbard
ATTORNEY

DATA DEMODULATOR EMPLOYING MULTIPLE CORRELATIONS AND FILTERS

BACKGROUND OF INVENTION

This invention relates to novel and improved data demodulators which employ the digital correlation and digital filtering demodulation technique described in the co-pending application of George R. Giles et al., entitled "Data Demodulator Employing Comparison," Ser. No. 858,627, filed Sept. 17, 1969.

The Giles et al. demodulation technique is applicable to both frequency modulating (FM) systems in which the carrier consists of different tone (frequency) signals for each binary bit value, frequently called frequency shift keying (FSK), and phase modulating (PM) systems in which the carrier consists of one or more tones with each tone having two or more phases to represent the data bit values, frequently called phase shift keying (PSK). According to the Giles et al. technique, a correlator operates upon the identity and non-identity of the received modulated signal with a delayed replica of itself to produce a correlation signal having one value upon identity and a different value upon non-identity. This correlation operation is simply embodied in an EXCLUSIVE OR network which operates on the received signal after limiting and on the delayed limited signal to provide the correlation signal. The correlation signal is then filtered in a digital filter which can be a rather simple UP/DOWN counter with the correlation signal controlling the direction of counting. The output of the counter provides an indication of the modulating information.

In the illustrated embodiment of the aforementioned Giles et al. application, a single correlator and a single digital filter were shown for the demodulation of an FSK and/or a differentially encoded binary PSK signal. The present invention differs therefrom in that two or more digital correlators and a like number of digital filters are employed to demodulate the modulated signal.

BRIEF SUMMARY OF THE INVENTION

An object of the present invention is to provide a novel and improved data demodulator.

Another object is to provide an improved data demodulator which can be embodied in relatively simple digital network configurations.

Still another object is to provide a novel and improved data demodulator which employs digital correlation and filtering techniques.

In brief, apparatus embodying the invention includes a correlation network which operates on the identity and non-identity of a modulating signal and at least two replicas of itself derived from the preceding baud or frame interval to produce first and second correlation signals. The first and second correlation signals are then filtered by means of first and second digital filters. The outputs of the digital filters are then compared with one and another in sign and/or magnitude to detect the modulating information.

The correlation network may suitably include an EXCLUSIVE OR network for each correlation. Each of the digital filters can be an UP/DOWN counter with the counting direction being determined by the respective correlation signals. The counters are operated as integrate and dump (I&D) filters. That is, each counter is enabled to count during an integrate window or aperture in each baud or frame of the modulating signal. The contents of each counter are dumped or loaded into a storage device, e.g., a register, at the termination of each integration window. The registers are then sampled by a comparison network to provide an indication of the modulating information.

BRIEF DESCRIPTION OF THE DRAWING

In the accompanying drawings, like reference characters denote like structural elements, and.

DESCRIPTION OF THE PREFERRED EMBODIMENT

It is contemplated that demodulator apparatus embodying the present invention may be employed for any type of modulated signal wherein multiple correlations and digital integrations are required to demodulate the signal. However, by way of example and completeness of description, a PSK demodulator embodying the invention will be described for a system which employs four phase differentially coherent PSK modulation.

Figures 1, 2:
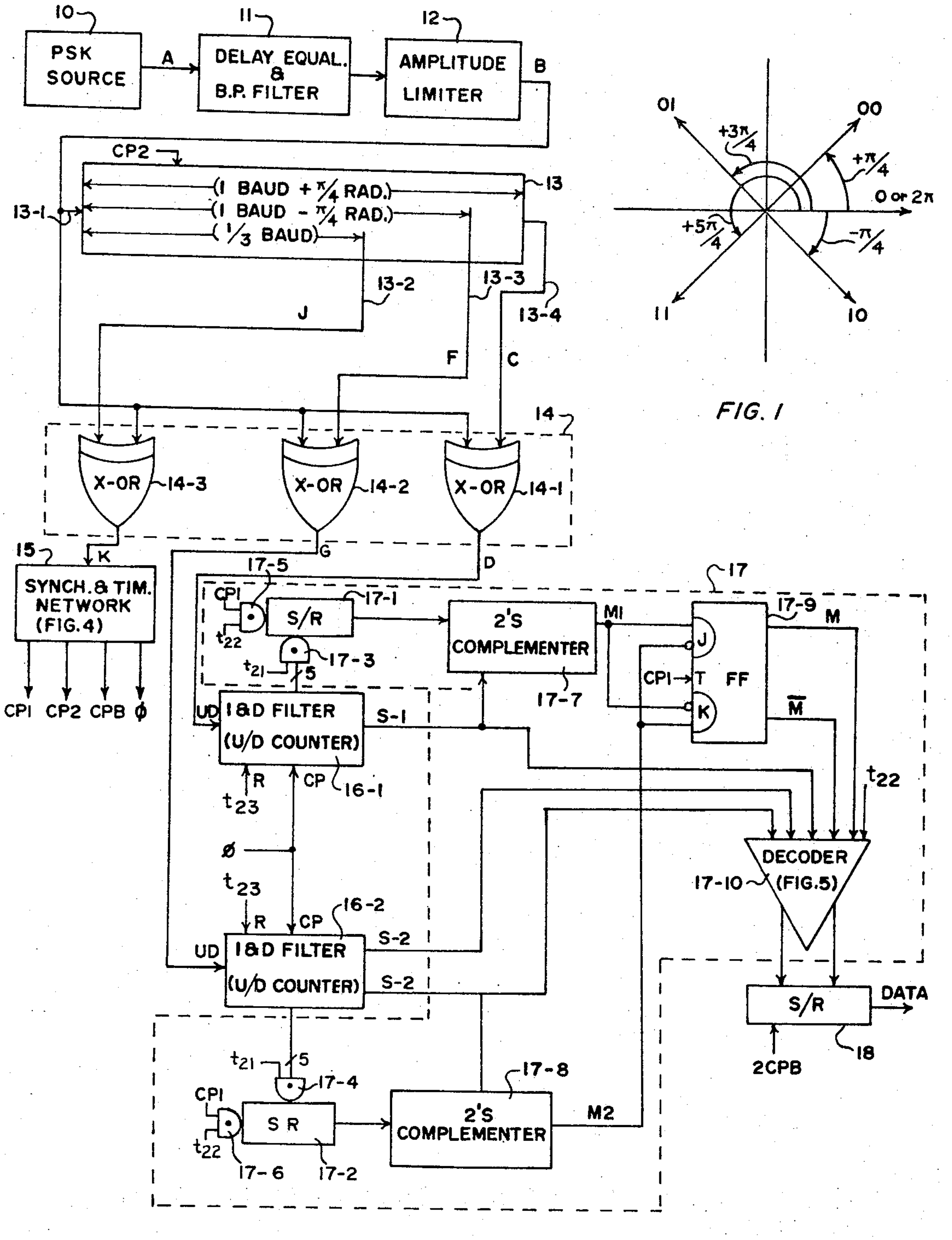
FIG. 1 is a vector diagram illustrating the phase encoding of a modulated signal with four phase PSK modulation, which signal can be demodulated with the demodulator of the present invention.
FIG. 2 is a block diagram, in part, and a logical network schematic, in part, of data demodulating apparatus embodying the present invention.

In a PSK modulated signal, the phase of the signal represents the data information. FIG. 2 graphically illustrates the phase encoding scheme normally employed in four phase differentially coherent PSK modulation. The four differential phase positions or vectors are shown to have phase angles of $+\pi/4$, $+3\pi/4$, $+5\pi/4$ and $-\pi/4$ radians with respect to the zero or $2\pi$reference. A different pair of bit values is assigned to each of the four differential carrier phases as shown in FIG. 1. Thus, the bit pair 00 is assigned to the phase vector $\pi/4$; the bit pair 01, to the vector $+3\ \pi/4$; the bit pair 11, to the vector $+5\pi/4$; the bit pair 10, the vector $-\pi 4$.

Figure 3:
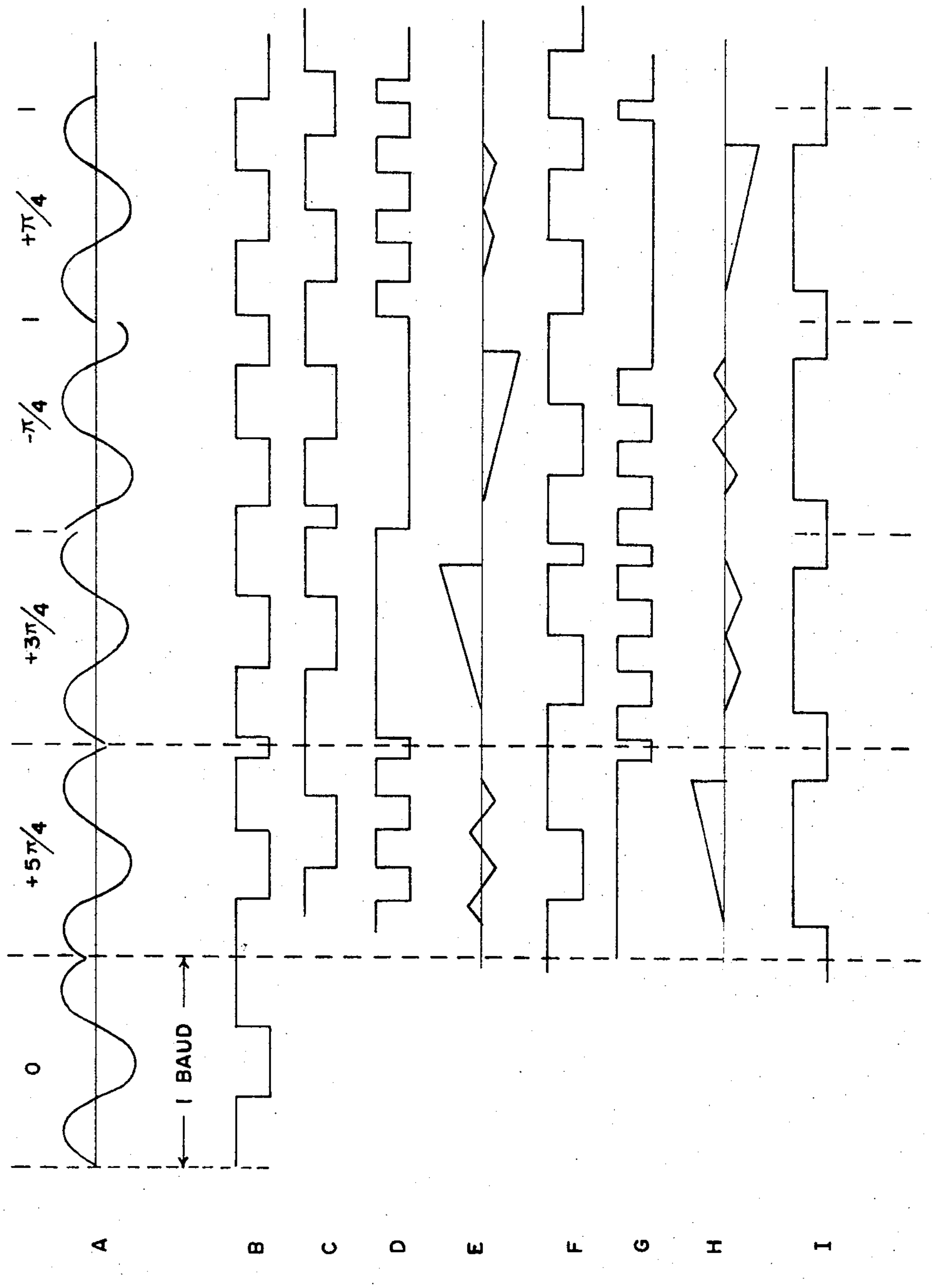
FIG. 3 is a waveform diagram illustrating the signals which occur at correspondingly designated points in the FIG. 2 diagram.

In FIG. 3, the waveform A represents a typical four phase differentially coherent PSK signal. By way of example, the waveform A has been shown in FIG. 3 for each of the four possible information phases as well as for the zero or reference phase of the carrier. As can be seen in FIG. 3, the PSK signal A is apportioned into baud or frame periods with each baud including three $\pi$ radians of the carrier. Two bits of information are encoded in the carrier in each baud or frame thereof.

A PSK demodulator embodying the invention will now be described in connection with the apparatus diagram of FIG. 2 and the waveform diagram of FIG. 3 which depicts, inter alia, the signals which occur at various points in the FIG. 2 demodulating apparatus. In FIG. 2, PSK signals of the type described above are provided from a source 10. It will be appreciated that the received PSK signals are usually derived from a communication channel such as a wire or cable link, a microwave link, radio link and the like, with the source 10 including the necessary receiving equipment. In addition, it is to be noted that the PSK signal at the sending end of the channel may be PSK modulated by any suitable PSK modulator.

The PSK signal from the source 10 may be applied to a delay equalizer network and bandpass filter 11 depending upon the communications channel characteristics. The delay equalizer network functions in the normal manner to provide envelope delay equalization and, for example, may consist of any suitable allpass network. The bandpass filter is operative to pass all of the frequencies which are expected to be in the PSK signal. For instance, in an exemplary 1,200 baud synchronous system the carrier frequency is 1,800 Hz: and bandpass filter 11 has a center frequency of 1,800 Hz. The output signal of the bandpass filter 11 may be amplified, if necessary, by means not shown and applied to an amplitude limiter 12. Amplitude limiter 12 is operative to clip the sinusoidal type PSK signal passed by filter 11 to provide at its output a limited signal B, the waveform of which is shown in FIG. 3.

The signal waveform B is applied to a delay element 13 having a plurality of taps 13-1 through 13-4 located at different electrical delays thereof. It is to be noted that the tap 13-1 serves both as the input point to the delay element and as a zero delay tap of the element. Although the delay element 13 may assume any suitable form of delay medium, it is preferably a digital shift register which is clocked at a rate CP2 which is much faster than the baud rate.

For the illustrated embodiment, the delay length is one baud $+\pi/4$ radian from the input tap 13-1 to the output tap 13-4. That is, the shift register 13 has a total length of one baud $+\pi/4$ radian at the carrier frequency. The waveform C on output tap 13-4 represents a delayed replica of the signal B for the baud which precedes each baud of the signal B appearing at tap 13-1. A first correlator 14-1 in a correlator arrangement 14 correlates the signals B and C to provide a correlated signal D on its output. As shown in FIG. 2, the correlator 14-1 (as well as the correlators 14-2 and 14-3) may assume the form of an EXCLUSIVE OR network which operates upon the identity and non-identity of its input signals to provide an output signal having one value upon identity and another different value upon non-identity.

The delay element tap 13-3 is 1 baud $-\pi/4$ radian delay away from the input tap 13-1. The signal F at tap 13-3 is therefore a replica of the preceding baud of the waveform B. The signals B and F are operated upon for identity and non-identity by another correlator network 14-2 which provides the correlation signal G on its output.

The delay deviation from one baud is determined by the amount of phase displacement between the phase vector $\pi/4$ and the 0 or $2\pi$ reference vector in FIG. 2 which phase displacement is $\pi/4$ radian for the illustrated four phase embodiment. On the other hand, if eight phase vectors were employed, the delay deviation would be $\pm\pi/8$ radians, for 16 phase vectors, $\pm\pi/16$ radians.

For the more than four phase cases the implementation may be extended by including more EXCLUSIVE OR comparators. One EXCLUSIVE OR is required for two phase, two for four phase, four for eight phase, etc. In addition a separate integrator will be required for each comparator and more complex magnitude comparators and decoders for more phases.

These implementations will also demodulate FSK signals. The FSK demodulation requires no synchronization circuitry.

The case of a single EXCLUSIVE OR circuit is described for binary FSK application in the aforementioned Giles et al. application. The two EXCLUSIVE OR circuits could provide correlation of two frequencies for binary FSK or of two frequency thresholds for three level FSK. The higher order FSK modulations can be implemented in a similar manner.

Each of the correlators 14-1 and 14-2 provides correlation with a different pair of the phase vectors. Thus, the baud $+\pi/4$ delay correlation is with the phase vectors $-\pi/4$ and $+3\pi/4$. On the other hand, the baud $-\pi/4$ correlation is with the phase vector $+\pi/4$ and $+5\pi/4$. This can be more clearly seen in the waveform diagram of FIG. 3 by an inspection of waveforms D and G. First, the waveform D is seen to be high during the $+3\pi/4$ baud and low during the $-\pi/4$ baud and to be randomly high and low during the other bauds. The G waveform is shown to be high during the $+5\pi/4$ baud and low during the $+\pi/4$ baud and to be randomly high and low during the remaining bauds.

In order to synchronize the demodulator with the modulated signal, baud or frame time information must be derived from the signal B which includes both the carrier frequency and baud frequency components. The correlator 14-3 serves to correlate the signal B with a replica J of itself delay in time by ½ cycle of the carrier delayed baud) so as to provide a correlation signal K in which the carrier frequency component has been eliminated. Accordingly, the delay element tap 13-2 is located a delay length of ⅙ baud away from the input tap 13-1. The signal J at the tap 13-2 is applied as one input to the correlator 14-3.

The G and D correlation signals are filtered by means of lowpass filters 16-1 and 16-2, respectively. Each of these filters takes the form of an UP/DOWN counter with the associated correlation signal controlling the direction of counting. That is, the associated correlation signal is applied to the UP/DOWN control lead of the counter. Each counter is operated on an integrate and dump cycle during each baud or frame. That is, each counter is enabled to count or integrate only during integration windows or apertures which are substantially centered in the middle of a baud and is disabled between the integration windows. Shortly after the termination of each integration, the contents of the counters 16-1, 16-2 are dumped or loaded into shift registers 17-1 and 17-2. These shift registers, which serve to provide a parallel to serial conversion of the contents of their associated counters, are part of a magnitude and sign comparator 17. The magnitude and sign comparator 17 serves to compare the magnitudes and signs of the contents of the counters 16-1 and 16-2 and to derive therefrom the bit values encoded in each baud of the input signal. These bit values are parallel loaded into a shift register 18 which is clocked at twice the baud rate $f_b$ so as to provide the output data at a bit rate of $2f_b$.

Figure 4:
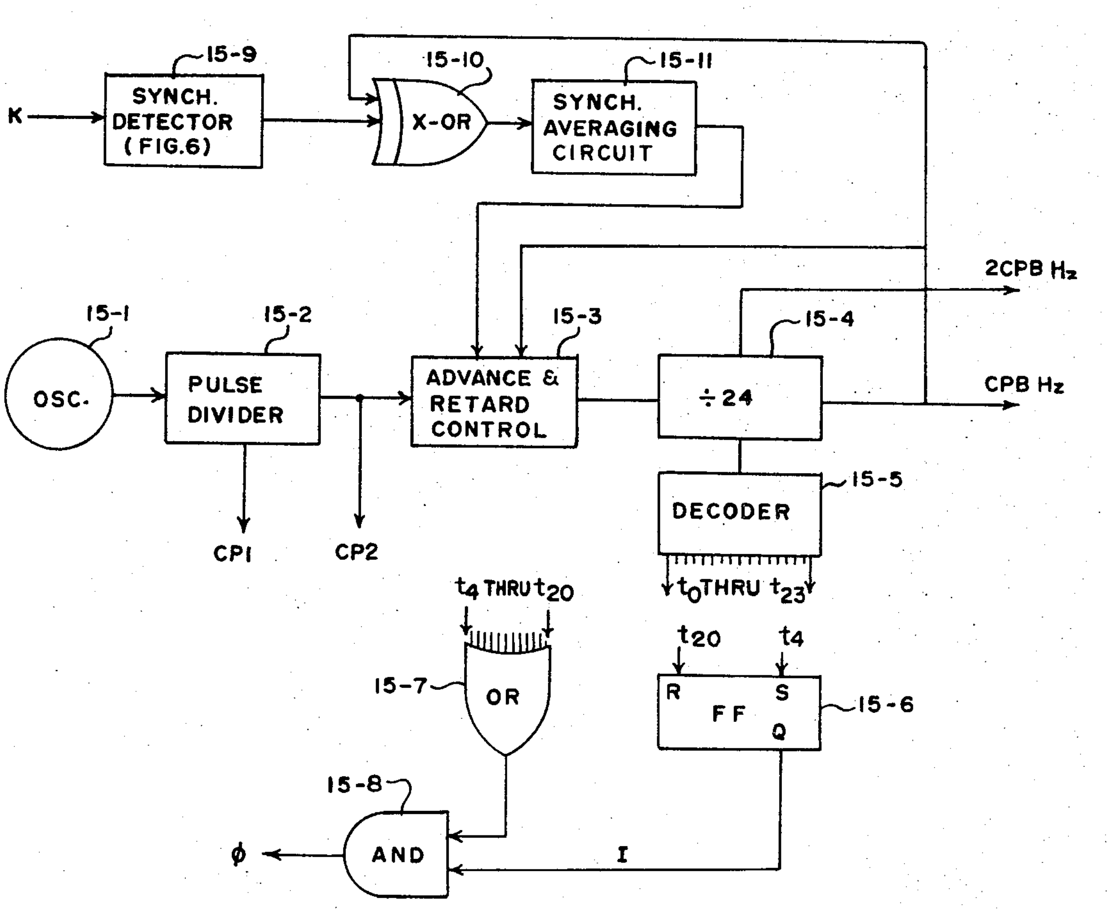
FIG. 4 is a block diagram, in part, and a logical network schematic, in part, of a synchronization and timing network which may be employed in data demodulator apparatus embodying the present invention.

Before describing the operation of counters 16-1, 16-2 and the sign and magnitude comparator 17 in further detail it is well to first describe the synchronization and timing network 15 which serves to synchronize the timing chain and timing circuits with the bauds or frames of the input signal as well as to generate the various clocks and execution signals employed in the demodulator. The synchronization and timing network 15 is shown in FIG. 4 to include a local oscillator 15-1 of which the operating frequency is a multiple of the baud rate $f_b$. A pulse divider network 15-2 serves to divide the frequency of the oscillator 15-1 so as to provide two clock signals CP1 and CP2 where the frequency of CP1 is greater than the frequency of CP2. The CP1 frequency is employed to clock the shift registers 17-1 and 17-2 (FIG. 2) and signal CP2 is employed to clock the register 13-1 (FIG. 2). The signal CP2 is also applied by way of an advance and retard control 15-3 to a divide by 24 network 15-4, which may be a counter. The outputs of all the stages of the network 15-4 are decoded in a decoder 15-5 so as to provide on 24 output leads 24 time pulses $t_0$ through $t_{23}$ during consecutive time slots. The 24 timing pulses serve to define a single baud or frame. Also derived from the divide by 24 network 15-4 is the baud frequency signal CPB and the bit rate frequency signal 2 CPB.

The timing signals $t_4$ and $t_{20}$ are employed to set and reset a flip-flop 15-6, the Q output of which serves to enable an AND gate 15-8 from time $t_4$ to $t_{20}$. When enabled, the AND gate 15-8 passes the clock pulses $t_4$ to $t_{20}$. To this end, the timing pulses $t_4$ to $t_{20}$ are ORED together in an OR network 15-7 the output of which is applied as an input to the gate 15-8. The output $\phi$ of the AND gate 15-8 then consists of 16 timing pulses the occurrence of which is substantially centered in a baud. The Q output of flip-flop 15-6 is also designated as the signal I which has been reproduced in FIG. 3 to show that it defines an integrate window which is substantially centered in a baud.

Synchronization of the baud clock CPB and the timing pulses $t_0$ through $t_{23}$ with the incoming signal is provided in the following manner. The correlation signal K (FIGS. 2 and 3) is applied to a synchronization detector 15-9. The synchronization detector 15-9 serves to filter the correlation signal K and to provide at its output a bi-valved signal, 1 cycle of which occurs during each baud of the input signal. The output signal of the synchronization detector 15-9 is then applied to a phase locked synchronization loop which consists of an EXCLUSIVE OR gate 15-10 which correlates the synch detector output signal with the baud clock CPB, a synch averaging circuit 15-11, the advance and retard control circuit 15-3 and the divide by 24 counter 15-4. The pulse widths of the correlation signal output of the EXCLUSIVE OR gate 15-10 are indicative of the phase difference of its two input signal;. The averaging circuit 15-11 serves to average or make more uniform the pulse widths of this phase difference correlation signal. That is, the circuit 15-11 averages the short term time variations or jitter of the incoming signal.

Figure 8:
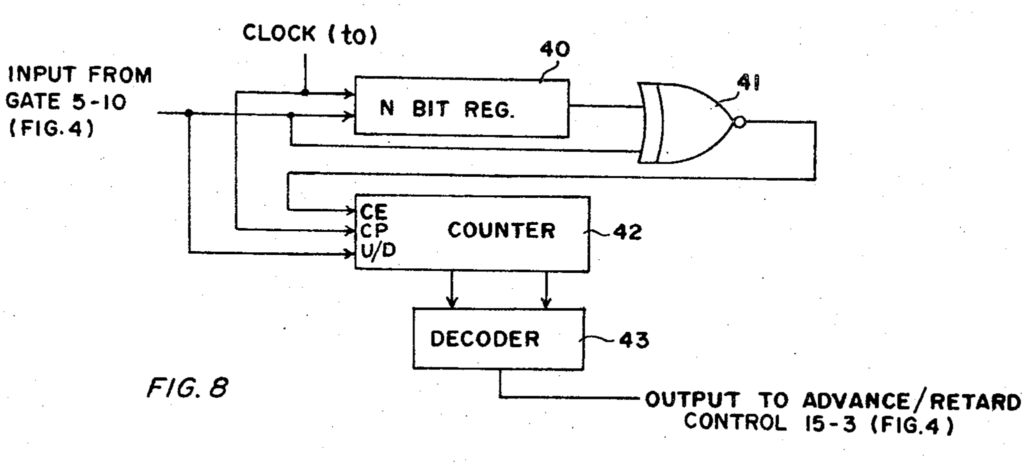
FIG. 8 is a block diagram of an averaging circuit which may be employed in the FIG. 4 network.

The averaging circuit 15-11 may take on any suitable form such as the one shown in FIG. 8. As there shown, the averaging circuit 15 includes a shift register 40, an EXCLUSIVE OR network 41, an up down counter 42 and a decoder 43 all arranged to provide an indication of a majority event over an *n* baud term. The *n* baud term is provided by the n bit shift register 40 which is clocked at the baud rate by the $t_0$ timing pulse to serially receive the output of the EXCLUSIVE OR gate 15-10 (FIG. 4) and to provide a serial output to the EXCLUSIVE OR gate 41. The EXCLUSIVE OR gate 41 correlates the output of the shift register 40 with its input so as to control the count enable input of the up down counter 42. When the inputs to the gate 41 are identical (either both 0's or both 1's) the counter 42 will be disabled. On the other hand, when the inputs to the gate 41 are dissimilar the counter 42 will be enabled to count. The direction of counting is controlled by the input to the shift register 40 (output of gate 15-10 in FIG. 4) such that the counter counts up when this value is a 1 and it counts down when the value is a 0.

The contents of the counter 42 then represent the number of 1's contained in the shift register 40. The decoder 43 is arranged to detect when the contents of counter 42 is either equal to or greater than $n/2$. Thus for a counter having $m$ stages, where $n = 2^m$, then decoder 43 can simply be the output of the last stage of the counter. However, in the more general case where $n$ is not exactly a power of 2, the counter 42 would include a number of stages equal to the next highest power of 2 (which is greater than $n$) and the decoder 43 would include a gating network for detecting counter states which are equal to or greater than $n/2$. The output of the averaging circuit 15-11 is then applied to advance and retard control of network 15-3.

The advance and retard control network 15-3 serves to add or delete pulses to the CP1 signal train applied to counter 15-4 depending upon whether the phase of the signal CPB is early or late with respect to the phase of the received signal. When there is perfect synchronization, the phase difference pulses from the averaging circuit should bridge or overlap the positive going transitions of the CPB signal. However, when the signal is initially received or is distorted by jitter, this is not usually the case such that the phase difference pulses may occur earlier or later than the positive going transition of the CPB signal. When a phase difference pulse occurs earlier than a positive going transition of the CPB signal, the network 15-3 adds or inserts a pulse into the CP2 pulse train applied to the counter 15-4. The result of this is to advance the occurrence of the positive going CPB transition by one twenty-fourth of baud. On the other hand, when a phase difference pulse occurs later than a positive going transition of the CPB signal, the advance and retard control 15-3 acts to delete a pulse from the CP2 pulse train applied to counter 15-4 so to retard the CPB signal by one twenty-fourth of a baud. The advance and retard control 15-3 may take on any suitable form such as the one disclosed in the co-pending application of Kenneth R. MacDavid et al entitled "Modem Tester," Ser. No. 874,839, filed Nov. 7, 1969.

Turning again to FIG. 2, the signal $\phi$ (the 16 timing pulses $t_4$ through $t_{20}$ from FIG. 4) is applied to the CP inputs of both counters 16-1 and 16-2 during each baud or frame of the received signal. The counters respond thereto to count either up or down in accordance with the value of the associated correlation signal D or G. For example, if the associated correlation signal has a high value, the direction of counting is up. On the other hand, if the associated correlation signal has a low value, the direction of counting is downward. An analog representation of the states of the counters 16-1 and 16-2 is shown by the waveforms E and H, respectively in FIG. 3. As there shown, if the associated correlation signal is randomly high and low during a baud, the counting direction is randomly up and down with a final value of substantially 0. On the other hand, if the value of the associated correlation signal is either predominately high or low during a baud, the counting direction is either up or down, respectively, so as to attain either a positive or negative value at the end of the integrate window (time $t_{20}$).

Thus, if the magnitude of counter 16-1 is greater than the magnitude of counter 16-2, then the encoded phase vector is either $-\pi/4$ or $+3\pi/4$. The sign of the magnitude of counter 16-1, if positive, indicates the vector $+3\pi/4$ and, if negative, indicates the vector $-\pi/4$. On the other hand, if the magnitude of counter 16-2 is greater, the encoded phase vector is either $+5\pi/4$ or $+\pi/4$. The sign of the magnitude of counter 16-2, if positive, indicates the $+5\pi/4$ vector and, if negative, indicates the $+\pi/4$ vector.

The values or numbers in the counters 16-1 and 16-2 are represented in two's complement form and for the present example are comprised of 5 bits with a sixth bit being a sign bit. The sign bits for the counters 16-1 and 16-2 are designated S-1 and S-2, respectively, in FIG. 2.

After the integration has been performed, timing signal $t_{21}$ causes the two's complement values in the counter 16-1 and 16-2 to be dumped or loaded into the associated shift registers 17-1 and 17-2 via the associated parallel input gating networks 17-3 and 17-4. At time $t_{22}$, the high speed clock CP1 is passed by the shift enable gates 17-5 and 17-6 so as to serially shift the two's complement values out of the registers 17-1 and 17-2, respectively. A pair of two's complementer networks 17-7 and 17-8 serve to convert the serial bit train from the register 17-1 and 17-2 from the two's complement form to the sign and magnitude form of expression. The two's complementer networks 17-7 and 17-8 also receive the sign bits S-1 and S-2 from the counters 16-1 and 16-2. The two's complementer may assume any suitable form such as the one shown as page 2-1.69 of a text entitled "Application Memos," available from Signetics Corporation of Sunneyvale, Calif.

The serial bit trains M1 and M2 out of the two's complementer network 17-7 and 17-8, respectively, are then compared serially bit by bit in a magnitude comparator 17-9 so as to determine which is the larger. The bit serial magnitude comparator 17-9 may assume any suitable form such as the illustrated multiple input JK flip-flop. In order to provide a serial bit comparison, the J&K inputs are connected so as to disallow the toggle condition (where both J&K are 1's or highs). This acts to render the JK flip-flop responsive to the most significant non-identical bit values and non-responsive to any further more significant but identical bit values. Thus, the M1 bit train is connected to one of the J inputs and its complement (represented by the small circle) is connected to one of the K inputs. The M2 bit train is connected to the other of the K inputs and its complement is connected to the other of the J inputs. The flip-flop 17-9 is then clocked at the high speed clock rate CP1. Accordingly, after the most significant bits (the fifth bits) of the M1 and M2 bit trains have been applied to flip-flop 17-9 its outputs M and $\overline{M}$ will indicate which of the bit trains M1 and M2 is larger. Thus, if M1 is larger than M2 M will be a 1 and $\overline{M}$ will be a 0, indicating the detection of the $+3\pi/4$ or the $-\pi/4$ phase vector. On the other hand, the M2 value is larger than the M1 value M will be a 0 and $\overline{M}$ will be a 1, indicating the detection of either the $+5\pi/4$ or the $+\pi/4$ vector.

Figure 5:
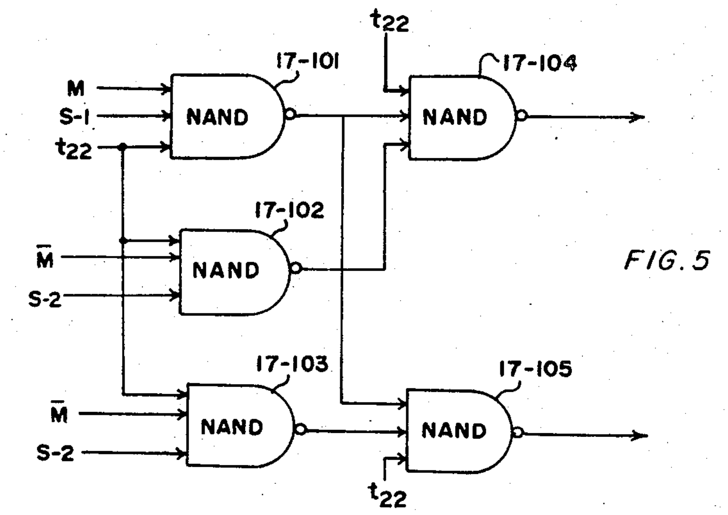
FIG. 5 is a logic schematic diagram of an exemplary decoder which may be employed in the FIG. 2 demodulator.

The M and $\overline{M}$ values together with the sign bit information (S-1, S-2 and S-$\overline{2}$) are decoded in a decoder 17-10 during the $t_{22}$ time slot to provide the appropriately valued bit pair for parallel loading into the shift register 18. The decoder 17-10 may employ any suitable gating arrangement such as the one shown in FIG. 5. As there shown, the decoder 17-10 includes first and second levels of NAND gates with the first level being enabled at time $t_{22}$ to respond to the M, $\overline{M}$, S-1, S-2 and S-$\overline{2}$ signals. The output bit pair is taken from the outputs of the two second level NAND gates which are also enabled by the $t_{22}$ signal. In operation, the NAND gate 17-101 senses the $+3\pi/4$ vector by receiving the M and S-1 signals. The gate 17-102 senses the $+5\pi14$ vector by receiving the $\overline{M}$ and S-2 signals. The gate 17-103 senses the $+\pi/4$ vector by receiving the $\overline{M}$ and S-$\overline{2}$ signals. The $-\pi/4$ vector is interpreted for the case where none of the first level NAND gates 17-101 through 17-103 change in state. The second level gates 17-104 and 17-105 respond to the outputs of the first level gates to produce the appropriately valued bit pair.

This bit pair is inserted or loaded into the shift register 18 during the $t_{22}$ sample time. The shift register 18 is clocked at the bit rate $2f_b$ by the bit clock 2 CPB so as to serially shift the data bits to the output data lead. During the last time slot in each baud or frame, the timing pulse $t_{23}$ is applied to the R inputs of both the counters 16-1 and 16-2 so as to reset them to their initial count values.

Figure 6:
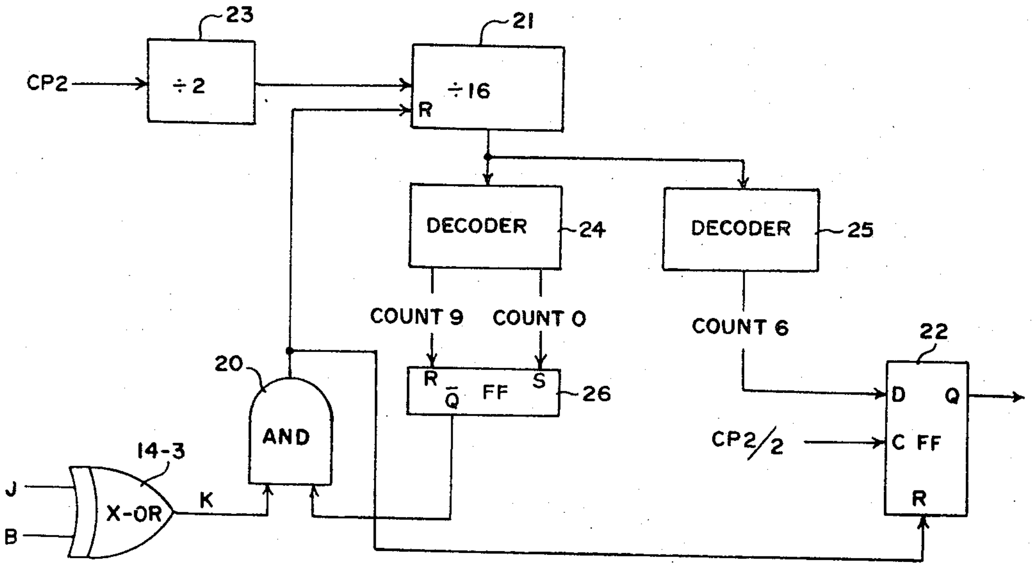
FIG. 6 is a block diagram, in part, and a logical network schematic, in part, of a synchronization detector which may suitably be employed in the synchronization and timing network of FIG. 4.
Figure 7:
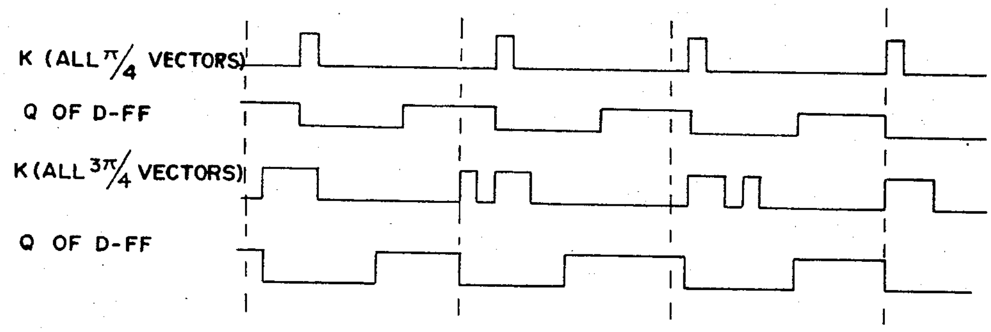
FIG. 7 is a waveform diagram illustrating the signals at the input and output of the FIG. 6 sync detector.

There is shown in FIG. 6 a suitable sync detector circuit which may be employed for the sync detector 15-9 FIG. 4. For reasons of convenience, the EXCLUSIVE OR correlator 14-3, shown in FIG. 2, has been reproduced in FIG. 6. As pointed out previously the correlator 14-3 correlates the hard limited PSK signal B with its delayed replica J (by the amount of ⅓ baud) to produce the correlated or baud timing signal K. The signal K, however, must be integrated in order to produce a substantially fifty percent duty cycle square wave for phase comparison with the locally generated baud clock CPB. The reason for this can be plainly seen in the waveform diagram of FIG. 7 wherein the signal K is shown in two versions. One of the versions is for the case where all $\pi/4$ vectors are encoded and the other version is for the case where all $3\pi/4$ vectors are encoded. For the all $\pi/4$ case, the signal K merely consists of a positive going pulse occurring once during each baud. The bauds or frames in FIG. 7 are indicated by the vertical dashed lines. However, for the all $3\pi/4$ vector case, the signal K consists of either one or two positive going pulses of varying pulse widths during each baud. The all $-\pi/4$ and all $+5\pi/4$ cases are similar to the illustrated all $\pi/4$ and all $+3\pi/4$ cases.

The sync detector shown in FIG. 6 includes an AND gate 20 which senses the first rising edge of the signal K in each baud. The output of the AND gate 20 is employed to both reset a counter 21 to a count of 0 and has a DC reset for a D type flip-flop 22. This causes the Q output of the D type flip flop to assume a low value (as shown in FIG. 7). The counter 21 which may be a divide by 16 network is arranged to count the output of a divide by two network 23 which is driven by the CP2 clock. A count decoder 24 senses the 0 count of the counter 21 to set a set reset flip flop 26. The $\overline{Q}$ output of the flip flop 26 will go low and is applied as an inhibit input to the AND gate 20. The flip flop 26 will not be reset until the count of nine such that any subsequent rising edges of the signal K will be ignored until thereafter.

Another decoder 25 is arranged to detect the count of six of counter 21 and in response thereto to provide a high level signal to the D input of the flip flop 22. On the next ensuing clock (CP2/2) the Q output of flip flop 22 is driven to the high level. At the count of nine the flip flop 26 is reset so that its $\overline{Q}$ output will enable the AND gate 20 to respond to the next succeeding rising edge of the signal K. When such a rising edge occurs in the next or ensuing baud, the D-flip flop 22 will again be reset and the counter 21 will also be reset so as to initiate the start of a new cycle. Q output of flip flop 22 is then phase compared with the locally generated CPB'-signal in the EXCLUSIVE OR comparator 15-10 of FIG. 4.

Figures 9, 10A:
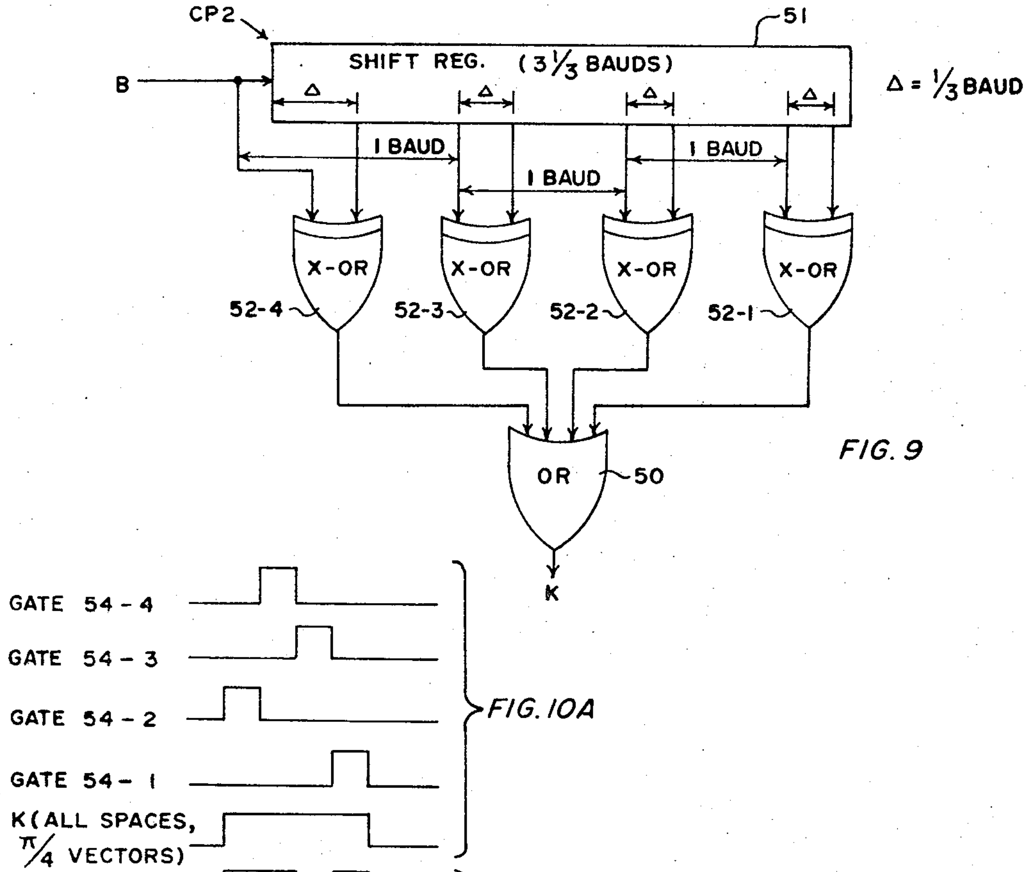
FIG. 9 is a block diagram, in part, and a logic schematic diagram, in part, of another embodiment of the invention in which the baud or timing signal is derived from a plurality of correlation networks.
FIGS. 10A and 10B are waveform diagrams which show the signal at various points in the FIG. 9 diagram for different vector patterns.

FIG. 9 shows an alternative embodiment in which the baud or timing signal K is derived from multiple correlation networks so as to provide additional averaging of noise and distortion (jitter). The technique employed is to average or mix the incoming signal with a delayed replica of itself over four consecutive bauds and then to combine or add the results together by means of an OR gate 50, the output of which is the K signal. To this end, a shift register 51 is provided to serially receive under the control of the CP2 clock the incoming B signal and to store at least 3⅛ bauds thereof. Four EXCLUSIVE OR gates 52-1 through 52-4 are provided, each to average or mix the B signal with a replica of itself delayed in time by Δ, where Δ equals ⅛ baud, for different ones of four consecutive bauds. Thus, at any given point in time, the gates 52-1 through 52-4 are performing their respective mixing functions on the B signal for the first through fourth bauds, respectively, the baud sequence being taken as they occur in timing sequence at the input of timing register 51. The mixed or averaged outputs of these four EXCLUSIVE OR gates are then combined together by means of the OR gate 50 so as to provide the composite signal K.

Figure 10B:
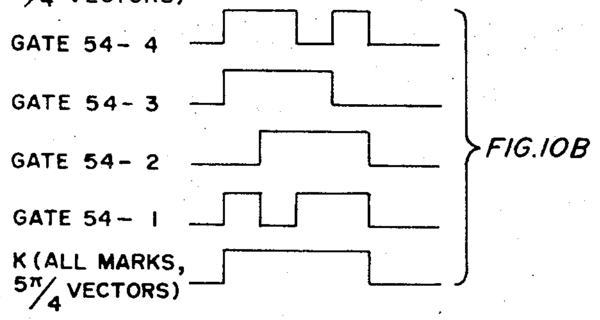

For the cases where the B signal pattern is comprised of all the same type of vectors, the signal K will have only one positive going excursion during each baud. FIGS. 10A and 10B show the signal K and the signal outputs of the gates 52-1 through 52-4 for the $\pm\pi/4$ and $\pm3\pi/4$ vector patterns, respectively. That is, the same signals waveforms prevail for both the $\pm\pi/4$ vector pattern and the same waveforms also apply to both the $\pm3\pi/4$ patterns. Although jitter has not been completely eliminated in the case of a random data pattern, significant reduction has occurred. The jitter present for random data is a function of the data pattern, has a deterministic characteristic and, hence, can be completely eliminated by further averaging.

In the arrangement presented with a baud rate of 1,200 Hg, carrier frequency of 1,800 Hz and constant modulation of $n\pi/4$ imposed each baud, the four baud circuit constitutes an ideal detection. This is true because the modulated carrier goes through a full cycle of variation in eight bauds and the detected sync signal out of one EXCLUSIVE OR goes through a full cycle of variations in four bauds (see FIG. 7 noting that the outputs of gates 14-3, FIG. 2, and 52-4, FIG. 9 are identical). This output is present at all four EXCLUSIVE ORS each displaced in time by one baud. For different modulations rates, carrier frequencies and/or number of phases a different number of EXCLUSIVE OR circuits can be employed to give an ideal detection.

There has been described a four phase differentially coherent PSK demodulator embodiment of the present invention. As previously pointed out, the illustrated circuitry is by way of example only, and other suitable arrangements may be employed.

What is claimed is:

1. A demodulator for an n phase differentially coherent PSK signal where n is an integer and each phase vector represents two bits of information, said demodulator comprising a delay element for delaying the PSK signal by one baud $\pm\pi/n$;

first and second EXCLUSIVE OR or networks for correlating the PSK signal with the baud $+\pi/n$ and baud $-\pi/n$ versions of itself, respectively, to provide first and second bivalued correlation signals;

synchronization means responsive to said PSK signal to provide during each baud thereof a sequence of timing pulses followed by a reset pulse the pulse sequences being substantially centered in the middle of the bauds;

first and second bidirectional counters responsive to said first and second correlation signals, respectively, to count said timing pulses in a first direction when the associated correlation signal has one of its values and in a second direction when it has the other of its values;

a comparator for comparing the signs and magnitudes of the count values in said counters after each such pulse sequence so as to detect which of the n phase vectors is encoded in each baud; and means for applying the reset pulse to said counters so as to reset them to an initial condition.

2. The invention according to claim 1
wherein said comparator includes
means for producing a magnitude signal having first and second values when the count value of the first counter is greater and lesser, respectively, then the count value of the second counter, and
means responsive to the signs of the count values and to the magnitude signal to produce a pair of binary signals representative of the bits encoded on the detected phase vector.

3. The invention as set forth in claim 2
wherein $n + 4$ and the four phase vectors are at $\pi/4$, $-\pi/4$, $+3\pi/4$ and $+5\pi/4$ radian referenced to zero or $2\pi$ radians of the carrier signal;
wherein the first value of said magnitude signal is indicative of either the $+3\pi/4$ or the $-\pi/4$ vector and the second value is indicative of either the $+\pi/4$ or the $+5\pi/4$ vector; and
wherein the binary signal producing means responds to the first value of said magnitude signal to produce said binary signal pair with values corresponding to $+3\pi/4$ and $-\pi/4$ vectors when the sign of the count value of the first counter is positive and negative, respectively, and further responds to the second value of said magnitude signal to produce said binary signal pair with values corresponding to the $+\pi/4$ and $+5\pi/4$ vectors when the sign of the count value of the second counter is positive and negative, respectively.

4. The invention as set forth in claim 1
wherein said delay element also delays the PSK signal by ⅛ baud;
wherein a third EXCLUSIVE OR network is provided to correlate the PSK signal with the ⅛ baud delayed version of itself to produce the third correlation signal; and
wherein the synchronization network includes
an oscillator coupled to a pulse divider network to produce said pulses, and
means responsive to the third correlation signal to synchronize said pulse divider network with said PSK signal.

5. A demodulator for detecting the information contained in a modulated carrier signal said demodulator comprising:
a delay element for delaying said modulated signal and having a plurality of outputs therefrom at which differently delayed replicas of said modulated signal appear;
a like plurality of EXCLUSIVE OR networks for correlating the undelayed signal with the delayed replicas of itself to provide a like plurality of bivalued correlation signals;
a source of clock signals;
a like plurality of bidirectional counters, each responsive to a different one of said correlation signals to count said clock signals in a first direction when the associated correlation signals have one of their values and in a second direction when it has the other of its values;
a comparator network for periodically comparing the signs and magnitudes of the count values in said counters so as to detect the information encoded in said modulated signal; and
means for periodically resetting each of said counters to initial conditions.

* * * * *

PO-1050
(5/69)

UNITED STATES PATENT OFFICE
CERTIFICATE OF CORRECTION

Patent No. 3,729,684 Dated April 24, 1973

Inventor(s) Donald G. Shuda

It is certified that error appears in the above-identified patent and that said Letters Patent are hereby corrected as shown below:

Column 4 line 54 change "delayed" to --(1/3 --.

Column 5 line 65 change "bi-valved" to --bi-valued--.

Column 10 line 47 delete "or" (second occurrence)

Column 11 line 13 change "+" to -- = --.

Signed and sealed this 12th day of November 1974.

(SEAL)
Attest:

McCOY M. GIBSON JR.
Attesting Officer

C. MARSHALL DANN
Commissioner of Patents